United States Patent [19]

Kosek et al.

[11] Patent Number: 5,523,177
[45] Date of Patent: Jun. 4, 1996

[54] MEMBRANE-ELECTRODE ASSEMBLY FOR A DIRECT METHANOL FUEL CELL

[75] Inventors: John A. Kosek, Danvers; Cecelia C. Cropley, Acton; Anthony B. Laconti, Lynnfield, all of Mass.

[73] Assignee: Giner, Inc., Waltham, Mass.

[21] Appl. No.: 322,110

[22] Filed: Oct. 12, 1994

[51] Int. Cl.$^6$ .............................. H01M 4/92; H01M 4/86
[52] U.S. Cl. ................................................ 429/40; 429/41
[58] Field of Search ......................................... 429/40, 41

[56] References Cited

U.S. PATENT DOCUMENTS

| | | | |
|---|---|---|---|
| 3,751,296 | 8/1973 | Beer | 117/230 |
| 3,840,443 | 10/1974 | Beer | 204/37 R |
| 4,210,501 | 7/1980 | Dempsey et al. | 204/129 |
| 4,311,569 | 1/1982 | Dempsey et al. | 204/129 |
| 4,390,603 | 6/1983 | Kawana et al. | 429/41 |
| 4,828,941 | 5/1989 | Sterzel | 429/40 |
| 4,876,115 | 10/1989 | Raistrick | 429/42 |
| 5,028,498 | 7/1991 | Lindström | 429/40 |
| 5,211,984 | 5/1993 | Wilson | 427/115 |
| 5,234,777 | 8/1993 | Wilson | 429/33 |
| 5,316,871 | 5/1994 | Swathirajan et al. | 429/41 |

Primary Examiner—Stephen Kalafut
Assistant Examiner—Carol Chaney
Attorney, Agent, or Firm—Hale and Dorr

[57] ABSTRACT

A direct methanol fuel cell (DMFC) contains a membrane electrode assembly (MEA) including an anode porous electrode structure which can operate on a liquid or vapor methanol/water feed in the absence of a liquid electrolyte such as sulfuric acid, a proton-exchange membrane electrolyte, and a porous gas-diffusion cathode. The anode porous electrode structure includes a three-dimensional reduced (Pt—Ru)O$_x$ catalyst particle-ionomer composite structure, whereby the ionomer coats the individual particles and provides a mechanism for continuous proton transport throughout the composite structure, eliminating the need for a liquid acidic electrolyte. The partially reduced (Pt—Ru)O$_x$ particles are individually ionomer coated prior to anode fabrication. The anode porous electrode structure is subsequently bonded to one side of a thin sheet of a solid proton-conducting ionomer membrane and a cathode structure bonded to the opposite side of the membrane, to form a MEA. Insertion of the MEA into appropriate hardware results in fuel cell fabrication.

17 Claims, 6 Drawing Sheets

MEMBRANE-ELECTRODE ASSEMBLY FOR A DIRECT METHANOL FUEL CELL

This invention is the result of a contract with the Department of Defense (Contract No. DAAL03-92-C-001).

BACKGROUND OF THE INVENTION

This invention relates to a membrane-electrode assembly (MEA) and, more particularly, to MEAs containing partially reduced metal oxide anode porous electrode structures for use with liquid or vapor methanol feed fuel cells in conjunction with proton-exchange membrane (PEM) solid electrolytes.

A fuel cell is a device which converts the energy of a chemical reaction into electricity. It differs from a battery in that the fuel and oxidant are stored external to the cell, which can generate power as long as the fuel and oxidant are supplied. The present invention relates to fuel cells in which the fuel is a liquid or vapor methanol/water mixture and the oxidant is air or oxygen. Protons are formed by oxidation of methanol at the anode and pass through a solid ionomer proton-exchange membrane electrolyte from anode to cathode. Electrons produced at the anode in the oxidation reaction flow in the external circuit to the cathode, driven by the difference in electric potential between the anode and cathode and can therefore do useful work.

The electrochemical reactions occurring in a direct methanol fuel cell which contains an acid electrolyte are:

Anode $CH_3OH + H_2O \rightarrow CO_2 + 6H^+ + 6e^-$ (1)
Cathode $3/2 O_2 + 6H^+ + 6e^- \rightarrow 3H_2O$ (2)
Overall $CH_3OH + 3/2 O_2 \rightarrow CO_2 + 2H_2O$ (3)

Many catalysts to promote methanol oxidation (Reaction 1) have been evaluated in the prior art due to the high polarization of this reaction on Pt. The types of catalysts investigated include: (1) noble metals, (2) noble metal alloys, (3) alloys of noble metals with non-noble metals, (4) chemisorbed layers on Pt, (5) platinum with inorganic material, and (6) redox catalysts. Based on literature reports, Pt—Ru appears to be the best methanol-oxidation catalyst in acidic electrolytes.

As shown by Vielstich, Küver and Krausa in *Proceedings of the Symposium on Batteries and Fuel Cells for Stationary and Electric Vehicle Applications,* published by The Electrochemical Society, Pennington, N.J., Vol. 93-8, p. 269, 1993, the increased activity of Pt—Ru, or more specifically, $(Pt—Ru)O_x$, over pure Pt for methanol oxidation is speculated to be due to a bi-functional mechanism, in which methanol is selectively adsorbed onto Pt atoms and $OH^-$ is chemisorbed on $RuO_x$, providing the oxygen necessary for oxidation of the adsorbed methanol species. Alternatively, as shown by Hamnett and Kennedy in *Electrochimica Acta,* Volume 33, p. 1613, 1988, the $RuO_x$ may promote formation of a Pt oxide at a nearby site and this Pt oxide reacts with the adsorbed methanol species. In either case, Ru must be oxided to promote the methanol-oxidation reaction on Pt. Also, to achieve maximum performance, it is very desirable to have an electrochemically clean $(Pt—Ru)O_x$ surface, free of adsorbing anions that may be used as electrolytes such as sulfate ions. The perfluorosulfonic acid ionomer that coats the noble metal oxide particle of this invention does not adsorb onto the active surface and locally provides rapid proton transport.

The methanol/water feed to a direct methanol fuel cell (DMFC), and more particularly to a proton-exchange membrane fuel cell (PEMFC) may be in liquid as well as the vapor phase. The PEMFC uses a hydrated sheet of a solid ionomer perfluorinated ion-exchange membrane as a solid electrolyte in the fuel cell; catalytic electrodes are intimately bonded to each side of the membrane. These membranes are commercially available from either DuPont (under the tradename Nafion) or from Dow Chemical. From a systems standpoint, operation on liquid methanol/water containing some of the corresponding vapor appears to be more advantageous. As shown by Cameron, Hards, Harrison and Potter in *Platinum Metals Review,* 31, 131, 1987, liquid feed stream operation of a DMFC which utilizes a membrane required a combination electrolyte system, consisting of the PEM and an additional acid, generally $H_2SO_4$. The $H_2SO_4$ is added to the fuel stream to provide ionic conductivity throughout the anode structure, which otherwise is limited to only the catalyst in direct contact with the solid membrane. The $H_2SO_4$ penetrates the anode structure, providing ionic conductivity throughout the electrode, thus allowing most of the catalyst to be utilized, resulting in improved performance. However, use of $H_2SO_4$ is undesirable due to sulfate species adsorbing onto the electrode surface, sulfuric acid's corrosive nature and the possibility of shunt current formation within bipolar fuel cell stacks.

These problems are addressed by the present invention, an MEA comprised of a partially reduced platinum-ruthenium oxide, $(Pt—Ru)O_x$, anode porous electrode structure which provides rapid proton conductivity and activity throughout the electrode structure with a PEM solid electrolyte and a cathode gas-diffusion electrode, with the anode porous electrode structure and cathode gas-diffusion electrode in intimate contact with the PEM.

Accordingly, it is a principal object of the present invention to provide a PEM fuel cell with a partially reduced catalyst, $(Pt—Ru)O_x$, capable of operation on a direct liquid or vapor methanol/water mixture.

Another object of the present invention is to provide an anode porous electrode structure capable of operation on direct methanol/water without addition of liquid supporting electrolyte.

Still another object is to provide uniform continuity of electronic and ionic paths about all of the catalyst sites.

Still another object is to provide an electrochemically clean reduced $(Pt—Ru)O_x$ particle surface by use of a coating with a perfluorosulfonic acid film and synergistically promote the direct methanol oxidation reaction by rapid proton transport.

SUMMARY OF THE INVENTION

The present invention is an MEA and a method of fabricating an MEA which can be used in a direct methanol PEM fuel cell. The MEA includes a partially reduced metal oxide anode porous electrode structure which can operate directly on a liquid or vapor methanol/water feed without the addition of a liquid electrolyte, a proton-exchange membrane electrolyte, and an efficient cathode gas-diffusion electrode.

In this invention, a proton-exchange membrane is used as the sole electrolyte, and an intimate partially reduced metal oxide porous electrode-PEM contact is maintained throughout the structure. In the partially reduced metal oxide anode porous electrode-PEM structure, a film of ionomer is formed from the face of the electrode in contact with the PEM extending back into the porous electrode toward the current collector. The catalyst particles that make intimate electronic contact with each other and with the current collector are coated with a thin solid ionomer film. There is a continuous ionomer proton-conducting ionic linkage throughout the porous electrode-solid ionomer composite structure that extends into the PEM, thus there is a continuous mechanism for rapid proton transport from the current collector to the PEM.

The partially reduced catalyst particles, (Pt—Ru)$O_x$, used in the anode electrode structure are prepared in a very-high-surface-area (70 m$^2$/g or greater) form. The particulate material is then coated with ionomer and fabricated into a porous electrode forming a high-surface-area interface with the solid ionomer-coated film and bonded to the solid PEM.

It has been found that 1) ionomer coating the very-high-surface-area partially reduced catalyst particles, (Pt—Ru)$O_x$, 2) forming a porous electrode from the coated particles, 3) integrally bonding the porous electrode to one side of a PEM, 4) integrally bonding a methanol-tolerant Teflon-bonded Pt black cathode structure to the opposite side of the PEM to form a complete MEA, and 5) placing the MEA in conventional fuel cell hardware, a device is obtained which, when liquid methanol/water is flowed across the solid ionomer-coated porous electrode, and pure $O_2$ is flowed across the cathode, and a resistance load connected across the cell, can produce at least 515 mV at 100 mA/cm$^2$ current density and 420 mV at 200 mA/cm$^2$ at 60° C.

These and other objects and features of the present invention will become more fully understood from the following detailed description which should be used in light of the accompanying drawings.

BRIEF DESCRIPTION OF THE DRAWINGS

The accompanying drawings, which are incorporated into and form a part of the specifications, illustrate an embodiment of the present invention and, together with the description, serve to explain the principles of the invention. In the drawings.

DETAILED DESCRIPTION OF THE INVENTION

Figure 1:
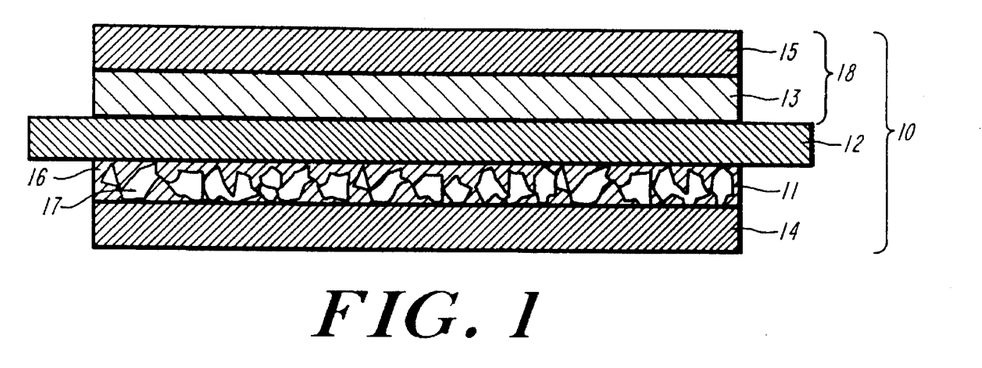
FIG. 1 is a cross-sectional view of a membrane-electrode assembly of the present invention.
Figure 2:
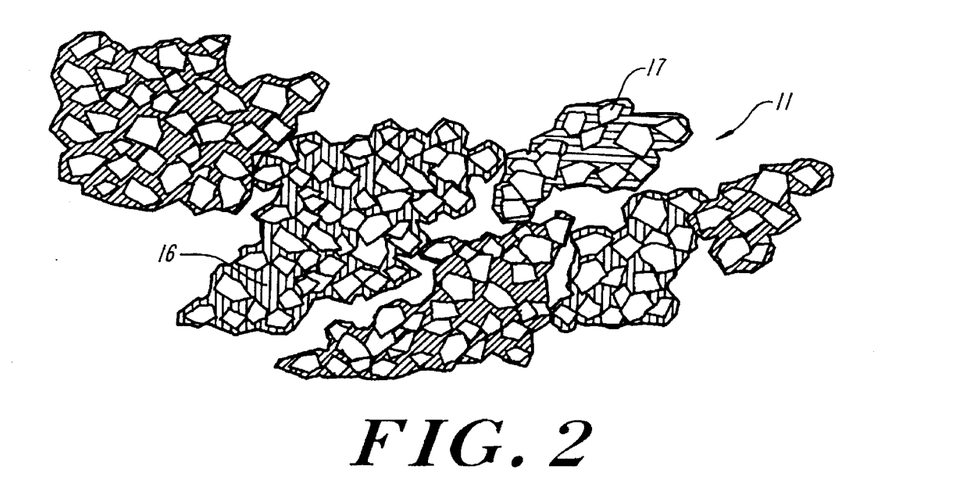
FIG. 2 is a representation of the anode porous structure in accordance with one embodiment of the present invention.

Referring primarily to FIGS. 1 and 2, a membrane-electrode assembly 10 of the present invention is shown. The membrane-electrode assembly 10 includes an anode porous electrode structure 11 partially reduced catalyst particles 17 coated with ionomer 16, bonded to and in intimate contact with a first surface of a proton-exchange membrane 12. Cathode gas-diffusion electrode 18 includes a catalyst layer 13 and a wetproofing layer 15, with catalyst layer 13 bonded to and in intimate contact with the second surface of proton-exchange membrane 12. Proton-exchange membrane 12 provides for ion transport between the anode structure 11 and the cathode catalyst 13. The partially reduced catalyst particles, (Pt—Ru)$O_x$, 17 throughout the anode structure 11 are coated with ionomer 16 to provide a continuous proton transport path, to provide an electrochemically clean reduced (Pt—Ru)$O_x$ particle surface and are in intimate contact with each other. FIG. 1 shows the integrally bonded anode structure 11 in intimate contact with a current collector 14. The current collector 14 can be porous carbon fiber paper, a lightly platinized titanium screen, or any other suitable porous material which has high electrical conductivity.

Prior art attempts at fabricating anode structures for direct methanol fuel cells have used either conventional porous gas-diffusion electrode structures comprised of high-surface-area carbon particles catalyzed with Pt or Pt alloys, or have used high loadings of metals or metal blacks deposited on an appropriate substrate. To achieve ionic conductivity throughout the electrode structure, use of a liquid electrolyte, such as an acid added to the liquid methanol fuel, was required. In the present invention, ionic conductivity within the electrode structure is obtained by coating the individual partially reduced catalyst particles, (Pt—Ru)$O_x$, 17 with a thin solid ionomer film.

In accordance with the present invention, the anode structure 11 includes high-surface-area partially reduced catalyst particles, (Pt—Ru)$O_x$, 17 coated with liquid ionomer 16. In a preferred embodiment the ionomer film coating is a solubilized form of Nafion 117, obtained from Solution Technology, Mendenhall, Pa. or Aldrich Chemical, Milwaukee, Wis. The anode structure 11 also includes a backing layer 14 of wetproofed carbon fiber paper. The catalyst composition can vary over the range 25-wt % Pt/75-wt % Ru to 75-wt % Pt/25-wt % Ru and the oxide content can vary from 5 wt % to 20 wt %. To provide ionic conductivity throughout the anode structure 11, the ionomer coating 16 on the partially reduced catalyst particles (Pt—Ru)$O_x$ 17 is a thin film from 3 to 20 wt % based on catalyst 17 loading. In addition to providing ionic conductivity, the ionomer 16 also serves as the catalyst binder in place of the polytetrafluoroethylene (PTFE) which is typically used in prior art as a catalyst binder in gas-diffusion electrodes. In the ionomer-bonded structure, the partially reduced catalyst particles 17 are in intimate contact with other catalyst particles to provide electronic conductivity, and with the ionomer, to provide ionic conductivity within the electrode structure and a continuous ionic path to the membrane electrolyte.

The partially reduced metal oxide catalyst particles 17 are prepared by thermally decomposing a mixture of the desired metal salts in the presence of excess oxidizing agents. Chloride salts or acids of Pt and Ru are mixed in the same weight ratio as desired in the final catalyst. This mixture is fused with an oxidizing agent at 300°–600° C. for several hours and is then thoroughly rinsed with water to remove excess salts and acids. Further processing steps include filtration, drying and sieving of the catalyst. As prepared, the catalyst contains both Pt and Ru oxides. Platinum oxide is a poor methanol-oxidation catalyst compared to Pt, so the catalyst is typically reduced by electrochemical treatment of the oxided particles to form a partially reduced metal oxide material having some alloying (up to 5%). This process generally reduces most of the Pt$O_x$ to Pt, without significant reduction of the $RuO_x$, which is much more difficult to reduce. Extensive reduction of $RuO_x$ is not desired, since $RuO_x$ is thought to be necessary for the $OH^-$ adsorption step in the methanol oxidation mechanism.

The anode catalyst used in the present invention has high surface area, with a typical value of ~100 $m^2/g$ for a 50% Pt:50% Ru preparation and ~60 $m^2/g$ for a catalyst containing 70% Pt:30% Ru. The oxide content on a weight of the catalyst is generally in the range of 5 wt % to 20 wt %. Catalyst performance in liquid methanol PEMFCs appears to be independent of Pt:Ru ratio, surface area and oxide content over the preferred range of 50 wt % to 75 wt % Pt.

The anode porous electrode structure 11 is formed by blending sieved partially reduced metal oxide catalyst particles 17 with an ionomer solution, containing approximately 5-wt % ionic solids dissolved in alcohol. The catalyst-to-ionomer solution ratio is chosen to yield the desired amount of ionomer coating 16, generally between 3 and 20 wt %. Sufficient ionomer to provide conductivity and to bind the catalyst particles must be used, but an excess of ionomer may decrease electronic conductivity and provide a diffusion barrier. Following blending of the catalyst and ionomer solution, the mixture is dried and cured. The coated catalyst particles are then formed into a layer of uniform thickness to provide an electrode structure, using any one of a number of techniques known to those skilled in the art. Anode structures 11 may be supported on carbon fiber paper, metal screen or other electrically conductive support for current collector 14 or may be placed directly on the membrane 12. The electrode 11 is then bonded to the proton-exchange membrane 12 under temperature and pressure to assure intimate contact between the membrane electrolyte and the catalyst/ionomer particles.

In a preferred embodiment, cathode structures 18 include 4 $mg/cm^2$ Pt black plus 5% PTFE supported on wetproofed carbon fiber paper (5 to 20% PTFE by weight), bonded to the opposite side of the proton-exchange membrane. Sufficient PTFE to bind the catalyst particles and provide wetproofing to shed product water must be used, but an excess of PTFE may decrease electronic conductivity and provide a diffusion barrier. The catalyst particles are then formed into a layer of uniform thickness to provide a cathode electrode structure 13. The cathode electrode structure 13 is supported on an electrically conductive support 15 such as carbon fiber paper containing 5–20% PTFE to shed product water and for current collection. The cathode structure 18 is then bonded to the proton-exchange membrane 12 under temperature and pressure to assure intimate contact between the membrane electrolyte and the catalyst particles.

In this invention, the typical concentration of the anolyte, comprised of methanol in water, was in the range 0.5 to 5 molar (M) while the preferred range is 1 to 2M. A significant quantity of water in the anolyte is required to support 1) the anode reaction: $CH_3OH+H_2O=CO_2+6H^++6e^-$ and 2) the requirement for electroosmotic transport. Each $H^+$ ion or proton electroosmotically transport 4 molecules of water from the anode side of the membrane to the cathode side. Thus for the above reaction, the six $H^+$ ions produced from the electrochemical oxidation of 1 molecules of methanol will electroosmotically transport 24 molecules of water from the anode to the cathode.

Figure 3:
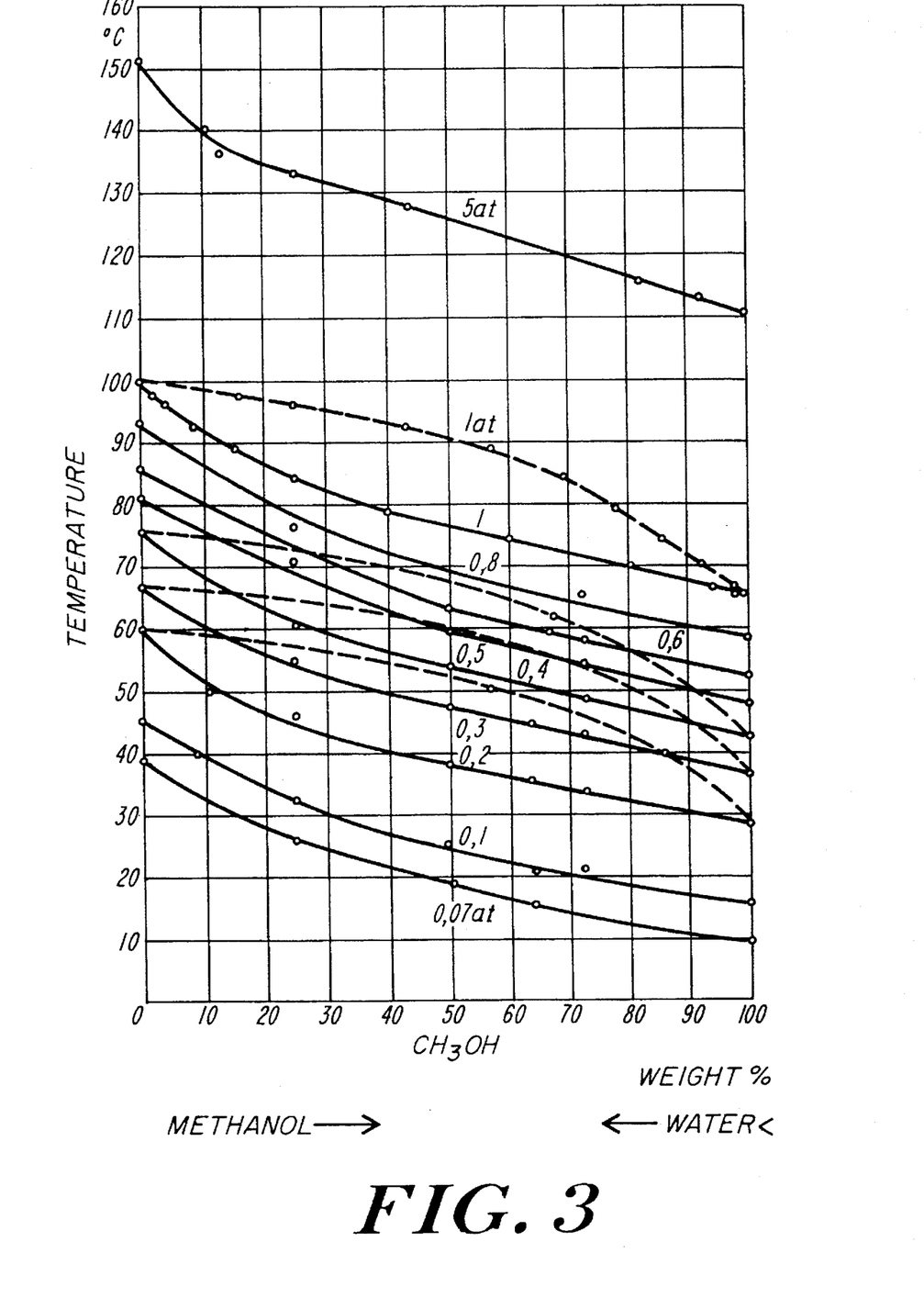
FIG. 3 is a graph showing temperature vapor pressure curves for mixtures of methanol and water.

The temperature-vapor pressure curves for mixtures of methanol and water are shown in FIG. 3 (J. D'Ans and E. Lax in *Taschenbuch für Chemiker und Physiker*, Graph 332221a, p. 898, Springer-Verlag, Berlin·Göttingen·Heidelberg, 1949). At 60° to 80° C., as shown in FIG. 3, for a 1M methanol-in-water solution containing approximately 3% by weight methanol, the composition of methanol in the vapor state is approximately 35 to 45%. At 60° C., as shown in FIG. 3, the total vapor pressure (methanol and water vapor) above the aqueous methanol solution is approximately 0.2 atm. If the percentage of alcohol in this vapor is 35%, then the methanol vapor pressure is approximately 0.07 atm. (0.35×0.2 atm.). At 80° C. the methanol vapor pressure increases to approximately 0.23 atm. (0.45× 0.5 atm.). The 1M methanol anolyte feed contains a substantial amount of water (liquid and vapor) thus preventing drying of the membrane at the anode/membrane interface. As previously described, at this interface protons are produced from the electrochemical oxidation of methanol and each proton can carry as much as 4 molecules of water from the anode to the cathode side. Excess water in the form of liquid or vapor must be added to the anode side to maximize performance. There is some backmigration of water from the cathode to the anode side. However, this alone is generally not sufficient in a $CH_3OH/Air$ $(O_2)$ system to prevent local drying at the anode/membrane interface. Using the partially reduced catalyst $(Pt—Ru)O_x$ anode with the aqueous methanol feed appears to produce highest direct methanol performance reported. Thus, in the 1M methanol-in-water PEMFC, methanol is electrochemically consumed in the liquid as well as the vapor state in the presence of excess water (liquid/vapor), and the higher the operating temperature the greater the methanol present in the vapor versus liquid state.

The following non-limiting examples describe particular MEAs fabricated in accordance with the principles of the present invention.

EXAMPLES

Example 1

Two batches of partially reduced catalyst, $(Pt—Ru)O_x$, were prepared using a thermal fusion method, the first with a 50-wt % Pt:50-wt % Ru composition and the second with a 55-wt % Pt:45-wt % Ru composition. Following electrochemical reduction, the first batch of partially reduced catalyst $(Pt—Ru)O_x$ had a surface area of 96.0 $m^2/g$, while the second batch had a surface area of 92.7 $m^2/g$. The oxide content of the partially reduced catalyst, $(Pt—Ru)O_x$, was typically in the range of 13 to 19%. Each catalyst was sieved, then blended with a 5% ionomer solution ("Nafion Solution" from Solution Technology, Inc. or Catalogue No. 27,420-4 from Aldrich Chemical, Milwaukee, Wis.) to yield an ionomer coating of 10 wt %. These catalysts were formed into 40-$cm^2$ active area porous electrodes with the partially reduced catalyst, $(Pt—Ru)O_x$, at a loading of 4 $mg/cm^2$ supported on wetproofed carbon fiber paper and bonded to one side of a Nafion 117 membrane. Cathode structures, fabricated by Giner, Inc. which were comprised of 4 $mg/cm^2$ Pt black plus 5% PTFE also supported on wetproofed carbon fiber paper were bonded to the opposite side of the membranes. An additional membrane-electrode assembly, consisting of a PTFE-bonded Pt black anode porous electrode structure, containing no liquid ionomer coating, and a Pt black plus 5% PTFE cathode structure on a Nafion 117 membrane was fabricated as a baseline structure.

The MEAs were subsequently placed in conventional fuel cell hardware such as that available from Giner, Inc. of Waltham, Mass. The MEAs were evaluated in a half-cell mode, passing gaseous $H_2$ over the cathode and a liquid methanol/water mixture over the anode. A power supply with the negative lead connected to the H$_2$ electrode was used to drive the cell. This technique allowed the measurement of anode polarization with respect to a reproducible H$_2$-evolving counter electrode. All testing was performed at 60° C.

Figure 4:
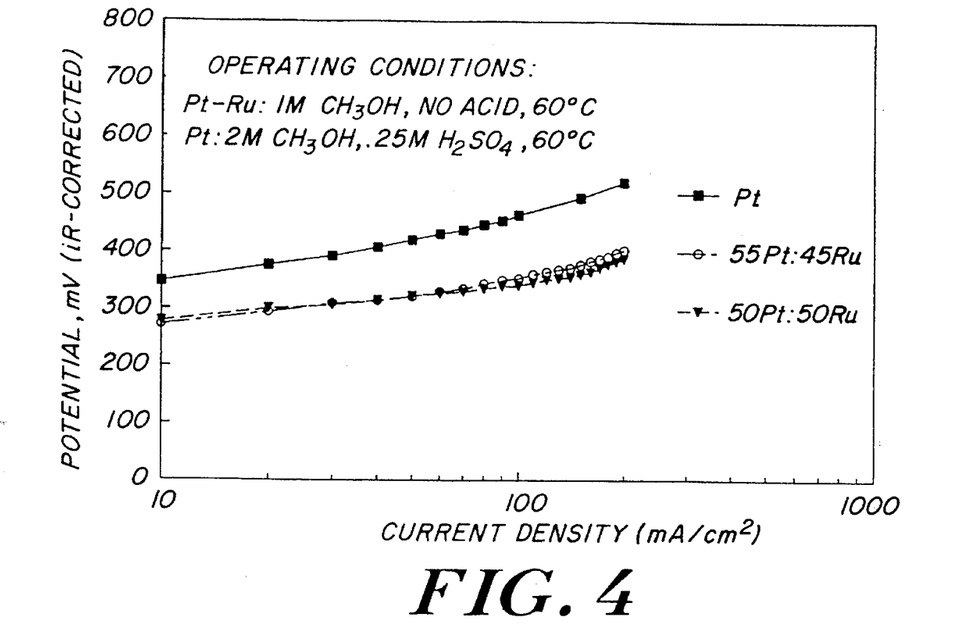
FIG. 4 is a graph comparing the performance of the partially reduced catalyst, (Pt—Ru)$O_x$, anode according to the present invention with a conventional platinum anode.

The two MEAs with the subject anode porous electrode structure containing the ionomer-coated partially reduced catalyst, (Pt—Ru)O$_x$, were run on a 1M CH$_3$OH/H$_2$O feed with no sulfuric acid present at 60° C. and low CH$_3$OH utilization in the half-cell test, while the Pt black anode structure with no ionomer coating was run on 2M CH$_3$OH/ 0.25M H$_2$SO$_4$ at the same conditions. The H$_2$SO$_4$ wetted the anode structure, provided ionic conductivity and extended the available electrochemically active area of the electrode. The polarization of the anode structures versus the H$_2$-evolving electrode is shown in FIG. 4. The two partially reduced catalysts, (Pt—Ru)O$_x$ fabricated into the porous electrode structures of the present invention had substantially lower polarization than the Pt black porous electrode structure, owing to both the more active catalysts and the improved ionic conductivity of the ionomer-containing anode structure. No substantial difference in performance between the partially reduced catalysts, (50Pt:50Ru)O$_x$ and (55Pt:45Ru)O$_x$, was noted.

Example 2

To determine the effect of ionomer coating, two separate membrane-electrode assemblies were fabricated and were tested in the half-cell mode as described in Example 1. The first had an anode porous electrode structure comprised of 4 mg/cm$^2$ of the partially reduced catalyst particles, (50Pt:50Ru)O$_x$, blended with 5% PTFE, while the second had an anode porous electrode structure of 4 mg/cm$^2$ the partially reduced catalyst particles, (50Pt:50Ru)O$_x$, coated with 10% ionomer prior to electrode fabrication; no PTFE was used in the second anode structure. Both MEAs contained a 4 mg/cm$^2$ Pt black plus 5% PTFE cathode structure, bonded to a Nafion 117 membrane. They were tested using the apparatus and conditions described in Example 1.

Figure 5:
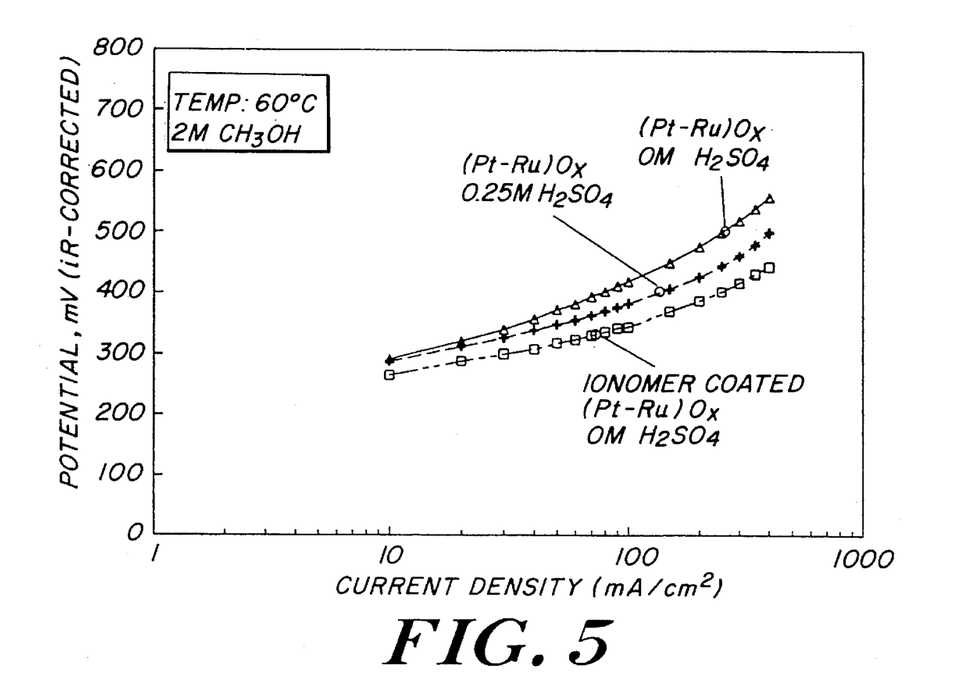
FIG. 5 is a graph comparing the performance of the partially reduced catalyst, (Pt—Ru)$O_x$, anode according to the present invention with a conventional (Pt—Ru)$O_x$ anode in the presence of $H_2SO_4$.

The first cell, without the ionomer-coated anode catalyst particles, was run on a 2M CH$_3$OH/H$_2$O feed in the absence and presence of 0.25M H$_2$SO$_4$; results are shown in FIG. 5. The second cell, with the ionomer-coated anode catalyst particles, was run on a 2M CH$_3$OH/H$_2$O feed in the absence of 0.25M H$_2$SO$_4$. Results are also shown in FIG. 5. A performance improvement was noted when H$_2$SO$_4$ was added to the liquid feed with the non-ionomer-coated anode porous electrode structure. A further performance improvement was observed using the ionomer-coated anode porous electrode structure in the absence of H$_2$SO$_4$. Ionomer coating provides ionic conductivity in the catalyst layer, supplanting the need for acid.

Example 3

Figure 6:
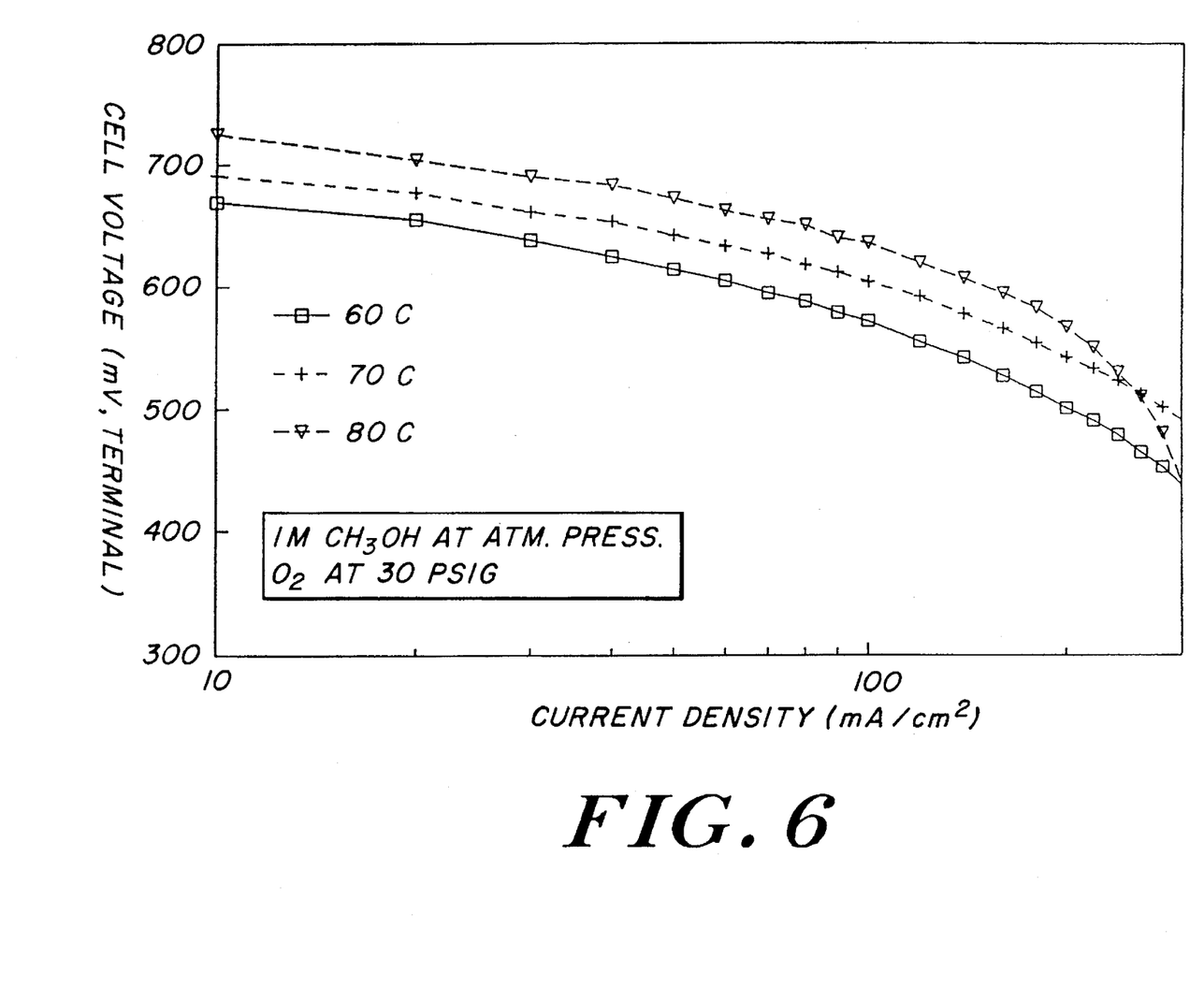
FIG. 6 is a graph showing the performance as a function of temperature of a liquid and vapor feed methanol/$O_2$ PEM fuel cell using an anode structure according to the present invention.

The cell with the ionomer-coated anode porous electrode structure described in Example 2 was also run as a fuel cell using 1M liquid methanol without a supporting electrolyte (acid) on the anode side and O$_2$ at 20–30 psig on the cathode; operating temperatures were 60°, 70° and 80° C. Terminal voltages of 535 mV and 425 mV were measured at 100 and 200 mA/cm$^2$, respectively, for 60° C. fuel cell operation and increased to 636 mV and 567 mV at 100 and 200 mA/cm$^2$ at 80° C. The results, shown in FIG. 6, indicate that with proper ionomer activation of the anode catalyst, a PEMFC system may be operated with a liquid or vapor methanol/ water feed alone and requires no liquid electrolyte.

Example 4

Figure 7:
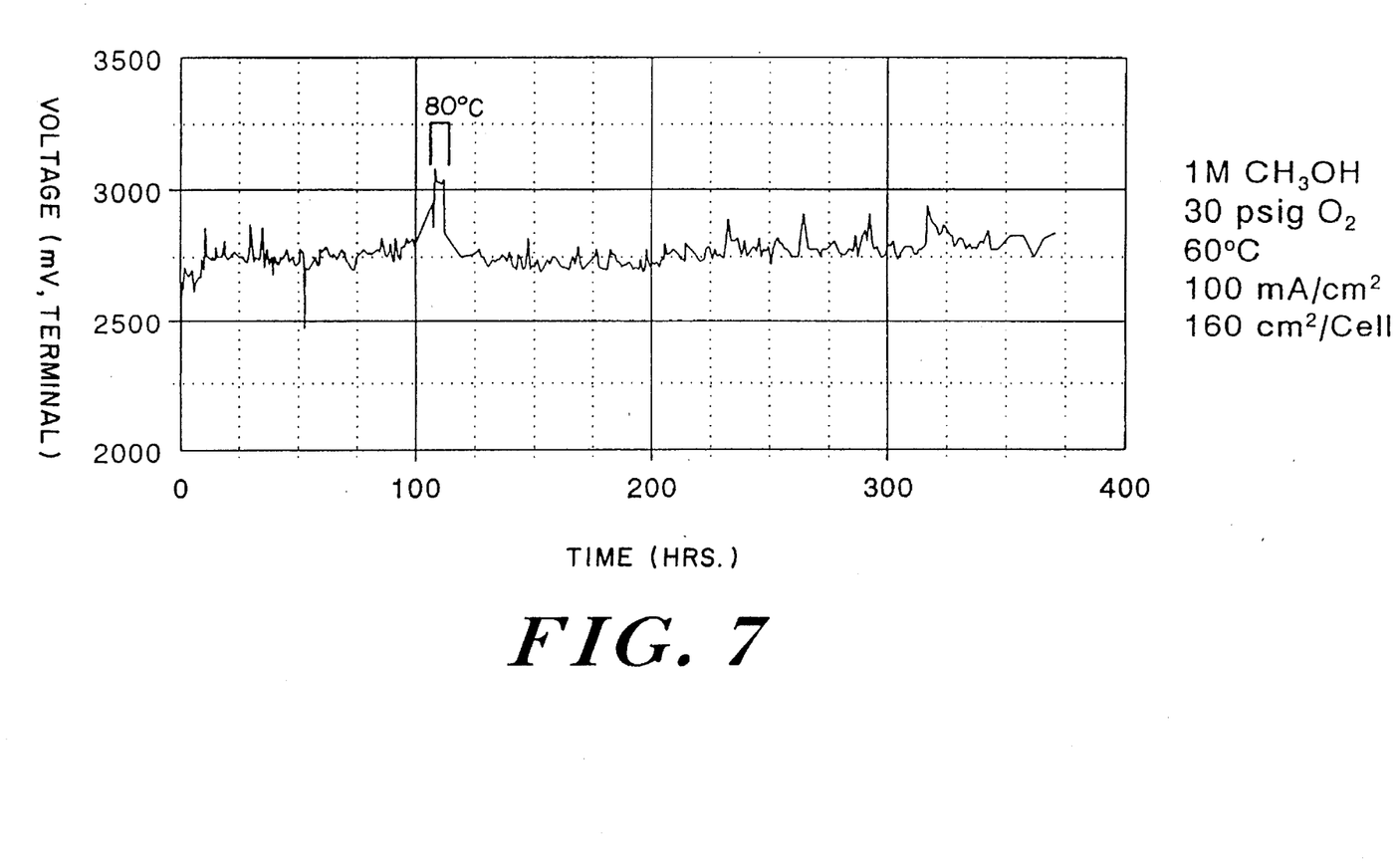
FIG. 7 is a graph showing life curves for a direct methanol PEM fuel cell stack.

A DMFC stack was fabricated using five MEAs containing the ionomer-coated anode porous electrode structure described in Example 2. The MEAs were configured in typical bipolar arrangement with current collectors contacting the MEA and bipolar plates in between each cell; this arrangement is known to those skilled in the art and is similar to that described by Lawrance in U.S. Pat. No. 4,214,969. The performance of the direct methanol/O$_2$ PEMFC stack at 60° C., operating with a 1M methanol-in-water anolyte feed and an O$_2$ cathode feed, is shown in FIG. 7. Stable performance was obtained over the 380-hour life test.

Example 5

Figure 8:
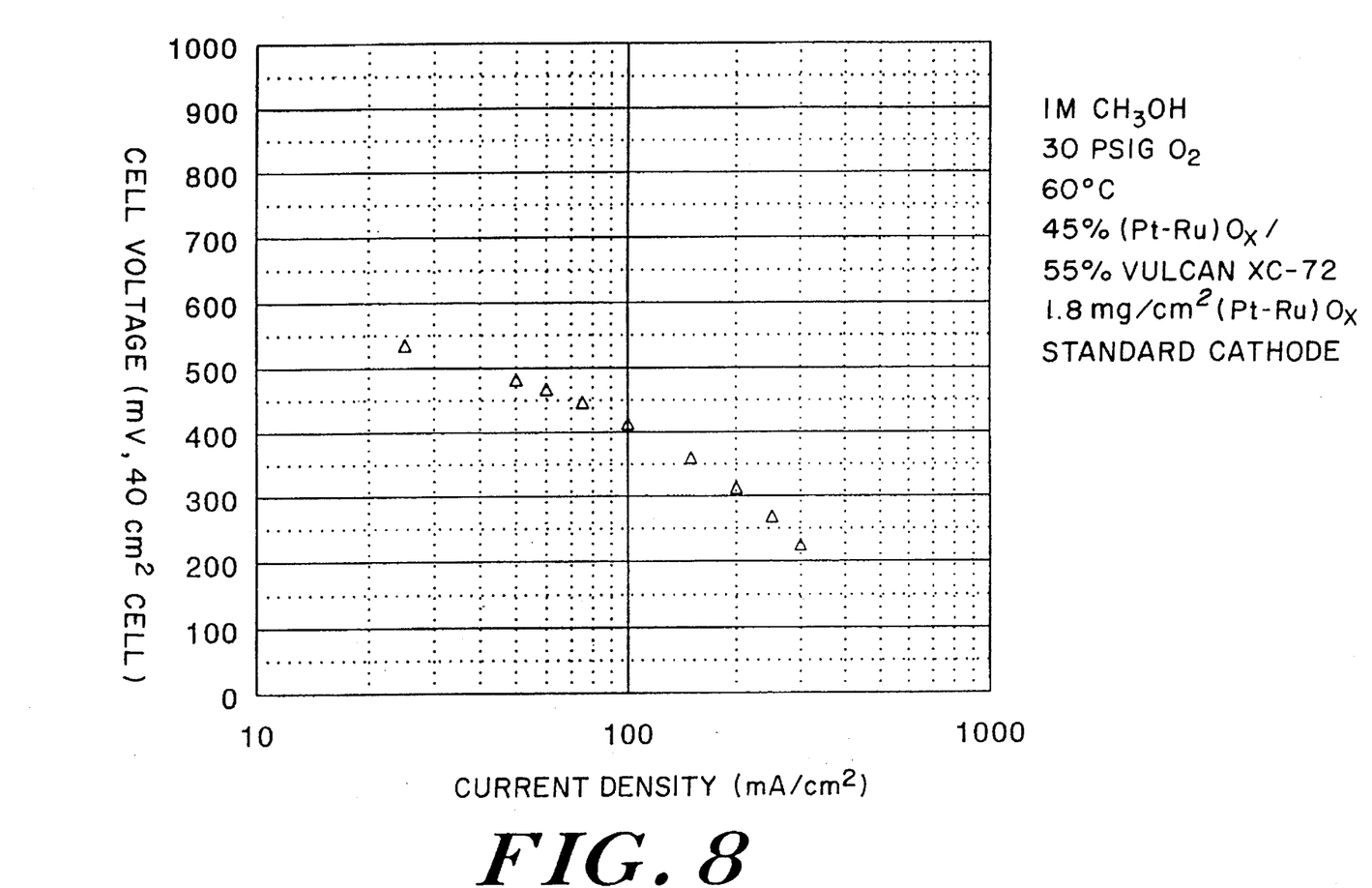
FIG. 8 is a graph showing the performance of an MEA containing the carbon supported partially reduced catalyst, (Pt—Ru)$O_x$.

In this example, the partially reduced catalyst, (Pt—Ru)O$_x$, supported on high-surface-area particulate carbon anode structures were prepared and formed into a membrane and electrode assembly as described in Example 1. A precursor platinum-ruthenium oxide catalyst containing approximately 50% by weight of ruthenium was prepared as described in Example 1. The unreduced catalyst was physically blended with a high-surface-area (250 m$^2$/g) Vulcan XC-72 carbon black (Cabot Corp.) and the resulting mix was electrochemically reduced to form the partially reduced catalyst, (Pt—Ru)O$_x$, supported on the carbon black. The catalytic particles were coated with a Nafion film as described in Example 1 and formed into an anode structure containing 1.8 g of partially reduced catalyst, (Pt—Ru)O$_x$, supported on approximately 2.2 g of the Vulcan carbon. A membrane and electrode assembly was formed from this supported catalyst and assembled into a direct methanol fuel cell. The performance is shown in FIG. 8. The potential advantage of using this high-surface-area carbon as a support is that it can be used as an extender to obtain electrode structures having low quantities of the partially reduced catalyst, (Pt—Ru)O$_x$.

In an alternative preparation, a ruthenium salt, preferably a nitrate salt, can be added alone or along with an oxidizing agent (nitric acid) to the carbon black and heated to approximately 200° to 300° C. to form a carbon-supported unreduced platinum-ruthenium oxide catalyst. This material is then electrochemically reduced as described in Example 1 to form a high-surface-area carbon-supported partially reduced catalyst, (Pt—Ru)O$_x$, catalyst. Other examples of suitable starting materials to prepare the unreduced and subsequently the partially reduced catalyst, (Pt—Ru)O$_x$, supported on carbon include (Pt—Ru)S$_x$ and Pt—Ru sulfites.

There are many advantages of operating a direct methanol/water feed fuel cell with the anode porous electrode structure of the present invention in the absence of a liquid, acidic electrolyte. Some of these advantages are: (1) synergistic performance improvement due to the reduced noble metal oxide particles being intimately coated with the ionomer film, (2) elimination of the need for a liquid electrolyte due to the formation of a highly proton-conducting path throughout the electrode structure, (3) formation of an electrochemically clean (Pt—Ru)O$_x$ particle surface due to the film of perfluorosulfonic acid on the surface which also provides the rapid proton transport and (4) elimination of the possibility of shunt current formation.

While the foregoing invention has been described with reference to its preferred embodiments, various alterations and modifications may occur to those skilled in the art. All such alterations and modifications are intended to fall within the scope of the appended claims.

We claim:

1. A membrane-electrode assembly for use in a direct methanol fuel cell comprising:

a partially reduced metal oxide anode porous electrode having an oxide content of between 5 wt % and 20 wt %;

a proton-exchange membrane electrolyte; and a porous gas-diffusion cathode.

2. The membrane electrode assembly according to claim 1 wherein said anode porous electrode comprises partially reduced metal oxide particles coated with a solid ionomer film of 3 to 20 wt % and intimately bonded to said proton-exchange membrane.

3. The membrane electrode assembly of claim 2, wherein said reduced metal oxide particles are (Pt—Ru)$O_x$ particles.

4. The membrane electrode assembly of claim 2, wherein said high surface area is greater than 70 $m^2/g$.

5. The membrane electrode assembly of claim 2, wherein said thin solid ionomer film is the same ionomer that forms said proton-exchange membrane.

6. An anode porous electrode comprising:

partially reduced metal oxide particles having an oxide content of between 5 wt % and 20 wt %;

a thin solid ionomer film coating said metal oxide particles;

said coated particles being arranged in a layer of a uniform thickness.

7. The anode porous electrode of claim 6, wherein said metal oxide particles are partially reduced (Pt—Ru)$O_x$ particles.

8. The anode porous electrode of claim 6, wherein said high surface area is greater than 70 $m^2/g$.

9. The anode porous electrode of claim 6, wherein said thin solid ionomer film is the same ionomer that forms said proton-exchange membrane.

10. The anode porous electrode of claim 6, wherein said ionomer composition in said ionomer film is from 3 to 20 wt %.

11. A method for fabricating a membrane electrode structure for use in a direct methanol proton-exchange membrane fuel cell comprising the steps of:

coating partially reduced metal oxide particles having an oxide content of between 5 wt % and 20 wt % with a thin solid ionomer film;

forming said solid ionomer-coated, partially reduced metal oxide particles into a particle layer having a uniform thickness; and intimately bonding said layer of solid ionomer-coated, partially reduced metal oxide particles to a proton-exchange membrane.

12. The method according to claim 11, wherein the step of coating said, partially reduced metal oxide particles with said thin solid ionomer film comprises the steps of:

blending the partially reduced metal oxide particles with an ionomer solution; and drying said blended partially reduced metal oxide particle-ionomer mixture.

13. The method according to claim 11 further comprising the step of blending said metal particles with a high surface area carbon black before said particles are partially reduced.

14. An anode porous electrode comprising:

partially reduced metal oxide particles supported on carbon black;

a thin solid ionomer film coating said partially reduced metal oxide particles;

said coated particles being arranged in a layer of a uniform thickness.

15. The anode porous electrode of claim 14, wherein said partially reduced metal oxide particles are partially reduced (Pt—Ru)$O_x$ particles.

16. The anode porous electrode of claim 14, further comprising a ruthenium salt added to said carbon black.

17. The anode porous electrode of claim 16, further comprising an oxidizing agent added to said carbon black.

* * * * *